(12) United States Patent (10) Patent No.: US 9,191,237 B1
Barry et al. (45) Date of Patent: Nov. 17, 2015

(54) WIRELESS COMMUNICATION SYSTEMS AND METHODS

(71) Applicants: Daniel T. Barry, South Hadley, MA (US); Andrew J. Barry, South Hadley, MA (US)

(72) Inventors: Daniel T. Barry, South Hadley, MA (US); Andrew J. Barry, South Hadley, MA (US)

(73) Assignee: DAN BARRY, INC., South Hadley, MA (US)

( * ) Notice: Subject to any disclaimer, the term of this patent is extended or adjusted under 35 U.S.C. 154(b) by 190 days.

(21) Appl. No.: 13/896,162

(22) Filed: May 16, 2013

Related U.S. Application Data

(60) Provisional application No. 61/651,471, filed on May 24, 2012.

(51) Int. Cl.
*H04L 12/58* (2006.01)

(52) U.S. Cl.
CPC .................................. *H04L 12/5895* (2013.01)

(58) Field of Classification Search
CPC .................................................. H04L 12/5895
USPC .......................................................... 709/206
See application file for complete search history.

(56) References Cited

U.S. PATENT DOCUMENTS

| | | | | | |
|---|---|---|---|---|---|
| 4,354,252 | A | * | 10/1982 | Lamb et al. .................... | 340/502 |
| 4,638,445 | A | * | 1/1987 | Mattaboni ........................ | 701/23 |
| 4,890,241 | A | * | 12/1989 | Hoffman et al. ............... | 700/255 |
| 4,939,728 | A | * | 7/1990 | Markkula et al. .............. | 370/419 |
| 5,293,639 | A | * | 3/1994 | Wilson et al. .................... | 455/17 |
| 7,461,156 | B2 | * | 12/2008 | Haupt et al. .................... | 709/228 |
| 7,609,686 | B1 | * | 10/2009 | McNamara et al. ........... | 370/356 |
| 7,702,739 | B1 | * | 4/2010 | Cheng et al. .................... | 709/207 |
| 7,801,959 | B1 | * | 9/2010 | Lennie et al. ................... | 709/206 |
| 7,827,459 | B1 | * | 11/2010 | Zhou et al. ...................... | 714/749 |
| 8,046,744 | B1 | * | 10/2011 | Marshall et al. ............... | 717/128 |
| 8,050,684 | B2 | * | 11/2011 | Lewis et al. .................... | 455/445 |
| 8,407,306 | B1 | * | 3/2013 | Nerieri et al. .................. | 709/206 |
| 8,619,799 | B1 | * | 12/2013 | Thodupunoori et al. ...... | 370/401 |
| 8,700,722 | B1 | * | 4/2014 | Sharma et al. ................. | 709/206 |
| 2002/0071427 | A1 | * | 6/2002 | Schneider et al. ............. | 370/352 |
| 2002/0160805 | A1 | * | 10/2002 | Laitinen et al. ................ | 455/550 |
| 2004/0164696 | A1 | * | 8/2004 | Yourlo et al. ............... | 318/568.11 |
| 2006/0047665 | A1 | * | 3/2006 | Neil ................................ | 707/10 |

(Continued)

OTHER PUBLICATIONS

Campbell et al., "The Message Session Relay Protocol (MSRP)", RFC 4975, 2007.*

(Continued)

*Primary Examiner* — O. C. Vostal
(74) *Attorney, Agent, or Firm* — Hayes Soloway P.C.

(57) ABSTRACT

Wireless communication systems and methods are provided. One such system includes a server configured to transmit an electronic message to a mobile device via one of a push communication and a non-push communication. The server is further configured to transmit a duplicate of the electronic message to the mobile device via the other of a push communication and a non-push communication. Systems for wireless communication with robots are also provided. One such system includes a user device, a robot interface application, hosted at least partially on a server, and a robot. The robot interface application receives an electronic message from the user device, and transmits the electronic message to the robot via one of a push communication and a non-push communication. The application further transmits a duplicate of the electronic message to the robot via the other of a push communication and a non-push communication.

31 Claims, 5 Drawing Sheets

(56) References Cited

U.S. PATENT DOCUMENTS

| | | | |
|---|---|---|---|
| 2006/0071929 A1* | 4/2006 | Stinis et al. | 345/213 |
| 2006/0105792 A1* | 5/2006 | Armbruster et al. | 455/517 |
| 2006/0106471 A1* | 5/2006 | Ikeda et al. | 700/83 |
| 2006/0178559 A1* | 8/2006 | Kumar et al. | 600/109 |
| 2006/0190526 A1* | 8/2006 | Neil et al. | 709/203 |
| 2006/0258287 A1* | 11/2006 | Bidet et al. | 455/41.2 |
| 2007/0100951 A1* | 5/2007 | Bae | 709/206 |
| 2007/0123307 A1* | 5/2007 | Adams et al. | 455/566 |
| 2007/0130255 A1* | 6/2007 | Wolovitz et al. | 709/204 |
| 2007/0156817 A1* | 7/2007 | Daffner et al. | 709/206 |
| 2007/0162582 A1* | 7/2007 | Belali et al. | 709/223 |
| 2007/0299918 A1* | 12/2007 | Roberts | 709/206 |
| 2008/0080370 A1* | 4/2008 | Willey | 370/229 |
| 2008/0109519 A1* | 5/2008 | Aaltonen et al. | 709/206 |
| 2008/0140789 A1* | 6/2008 | Mulligan et al. | 709/206 |
| 2008/0244040 A1* | 10/2008 | Bhatia et al. | 709/219 |
| 2008/0305775 A1* | 12/2008 | Aaltonen et al. | 455/412.1 |
| 2009/0047929 A1* | 2/2009 | Chesnutt et al. | 455/411 |
| 2009/0163244 A1* | 6/2009 | Parkkinen et al. | 455/558 |
| 2009/0209250 A1* | 8/2009 | Huq | 455/425 |
| 2009/0281880 A1* | 11/2009 | Lee | 705/11 |
| 2010/0070588 A1* | 3/2010 | Sinn et al. | 709/206 |
| 2010/0094461 A1* | 4/2010 | Roth et al. | 700/251 |
| 2010/0094985 A1* | 4/2010 | Abu-Samaha et al. | 709/223 |
| 2010/0131103 A1* | 5/2010 | Herzog et al. | 700/259 |
| 2010/0314226 A1* | 12/2010 | Patel et al. | 200/237 |
| 2011/0071676 A1* | 3/2011 | Sanders et al. | 700/250 |
| 2011/0087571 A1* | 4/2011 | Sagi et al. | 705/34 |
| 2011/0125856 A1* | 5/2011 | Chu et al. | 709/206 |
| 2011/0173621 A1* | 7/2011 | Meijer et al. | 718/102 |
| 2011/0213657 A1* | 9/2011 | O'Malley et al. | 705/14.49 |
| 2011/0225578 A1* | 9/2011 | Lauwers et al. | 717/176 |
| 2011/0231050 A1* | 9/2011 | Goulding | 701/26 |
| 2011/0238211 A1* | 9/2011 | Shirado et al. | 700/246 |
| 2011/0307403 A1* | 12/2011 | Rostampour et al. | 705/325 |
| 2012/0033605 A1* | 2/2012 | Yang et al. | 370/312 |
| 2012/0042028 A1* | 2/2012 | Langoulant et al. | 709/206 |
| 2012/0069131 A1* | 3/2012 | Abelow | 348/14.01 |
| 2012/0122425 A1* | 5/2012 | Adams et al. | 455/412.1 |
| 2012/0185547 A1* | 7/2012 | Hugg et al. | 709/206 |
| 2012/0284397 A1* | 11/2012 | Cheng | 709/224 |
| 2012/0303774 A1* | 11/2012 | Wilson et al. | 709/223 |
| 2012/0311046 A1* | 12/2012 | Grigoriev | 709/206 |
| 2012/0315879 A1* | 12/2012 | Vrbaski et al. | 455/412.1 |
| 2013/0007299 A1* | 1/2013 | German et al. | 709/237 |
| 2013/0047034 A1* | 2/2013 | Salomon et al. | 714/18 |
| 2013/0050743 A1* | 2/2013 | Steely et al. | 358/1.15 |
| 2013/0111572 A1* | 5/2013 | Gaddam et al. | 726/7 |
| 2013/0120547 A1* | 5/2013 | Linnell | 348/61 |
| 2013/0173727 A1* | 7/2013 | Libin et al. | 709/206 |
| 2013/0179514 A1* | 7/2013 | Arora et al. | 709/206 |
| 2013/0212203 A1* | 8/2013 | Park et al. | 709/206 |
| 2013/0231779 A1* | 9/2013 | Purkayastha et al. | 700/259 |
| 2014/0009561 A1* | 1/2014 | Sutherland et al. | 348/14.05 |
| 2014/0095216 A1* | 4/2014 | Radhakrishnan | 705/5 |
| 2014/0184423 A1* | 7/2014 | Mensinger et al. | 340/870.09 |
| 2014/0270115 A1* | 9/2014 | Burnett et al. | 379/88.12 |
| 2014/0304238 A1* | 10/2014 | Halla-Aho et al. | 707/692 |

OTHER PUBLICATIONS

Campbell et al., "The Message Session Relay Protocol", 2005.*
Libin et al., U.S. Appl. No. 61/580,907, filed Dec. 28, 2011.*

* cited by examiner

WIRELESS COMMUNICATION SYSTEMS AND METHODS

CROSS-REFERENCE TO RELATED APPLICATION

This Application claims priority from U.S. Provisional Application No. 61/651,471, filed May 24, 2012.

FIELD OF THE DISCLOSURE

The present disclosure is generally related to wireless communications, and more particularly is related to systems and methods for wireless communication with mobile computerized devices such as cell phones, tablet computers, robots and the like, which may travel through multiple wireless network areas and/or operate in environments where wireless signals may be noisy, intermittent and/or weak.

BACKGROUND OF THE DISCLOSURE

Wireless communication and commanding with mobile devices is challenging in environments where the wireless signal is not strong and consistent. For example, a telepresence robot navigating through an office environment, based on commands from a remote user, may need to switch from one wireless router (or wireless network) to another as it traverses the office area. Such switching between wireless networks can cause disruption in the communications between the user and the robot. For example, the robot may not receive certain commands from the user, and the user may not receive certain information from the robot. In the example of a telepresence robot, this means the user may not only lose the ability to control the movements of the robot, but may further lose a video, text and/or audio connection with the robot environment.

Thus, a heretofore unaddressed need exists in the industry to address the aforementioned deficiencies and inadequacies.

SUMMARY OF THE DISCLOSURE

Embodiments of the present disclosure provide wireless communication systems and methods. In one embodiment, a system for wireless communication is provided that includes a server configured to transmit an electronic message to a mobile device via one of a push communication and a non-push communication. The server is further configured to transmit a duplicate of the electronic message to the mobile device via the other of a push communication and anon-push communication.

In another embodiment, a mobile computer device is provided that is configured to receive an electronic message transmitted via push communication, and to receive the electronic message via non-push communication. The mobile computer device is further configured to determine a time difference between the time of receipt of the message via push communication and the time of receipt of the message via non-push communication.

In another embodiment, a method of wireless communication is provided that includes the steps of transmitting an electronic message to a mobile device via one of a push communication and a non-push communication; and transmitting a duplicate of the electronic message to the mobile device via the other of a push communication and a non-push communication.

In yet another embodiment, a system for wireless communication with a robot is provided that includes a user device, a robot interface application, hosted at least partially on a server, and a robot. The robot interface application is configured to receive an electronic message from the user device, and to transmit the electronic message to the robot via one of a push communication and a non-push communication. The robot interface application is further configured to transmit a duplicate of the electronic message to the robot via the other of a push communication and a non-push communication.

In another embodiment, a robot control system is provided that includes a robot interface application for facilitating communication between a plurality of user devices and a robot. The robot interface application is configured to provide one of the plurality of user devices with operational control over the robot, and to provide the others of the plurality of user devices limited access to the robot.

In another embodiment, a system for wireless communication with a robot is provided that includes a user device, a robot interface application, hosted at least partially on a server, and a robot having two or more wireless communication modules. The robot interface application is configured to receive an electronic message from the user device, and to transmit the electronic message to each of the two or more wireless communication modules of the robot via one of a push communication and a non-push communication. The robot interface application is further configured to transmit a duplicate of the electronic message to each of the two or more wireless communication modules of the robot via the other of a push communication and a non-push communication.

In yet another embodiment, a system for wireless communication between mobile devices is provided that includes a plurality of mobile devices. Each of the mobile devices are configured to transmit an electronic message to another of the mobile devices via one of a push communication and a non-push communication. The mobile devices are further configured to transmit a duplicate of the electronic message to the other mobile devices via the other of a push communication and a non-push communication.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many embodiments of the disclosure may take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

The disclosure also can be practiced in distributed computing environments, where tasks or modules are performed by remote processing devices that are linked through a communications network. Moreover, the disclosure can be practiced in Internet-based or cloud computing environments, where shared resources, software and information may be provided to computers and other devices on demand. In a distributed computing environment, program modules or subroutines may be located in both local and remote memory storage devices. Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Figure 1:
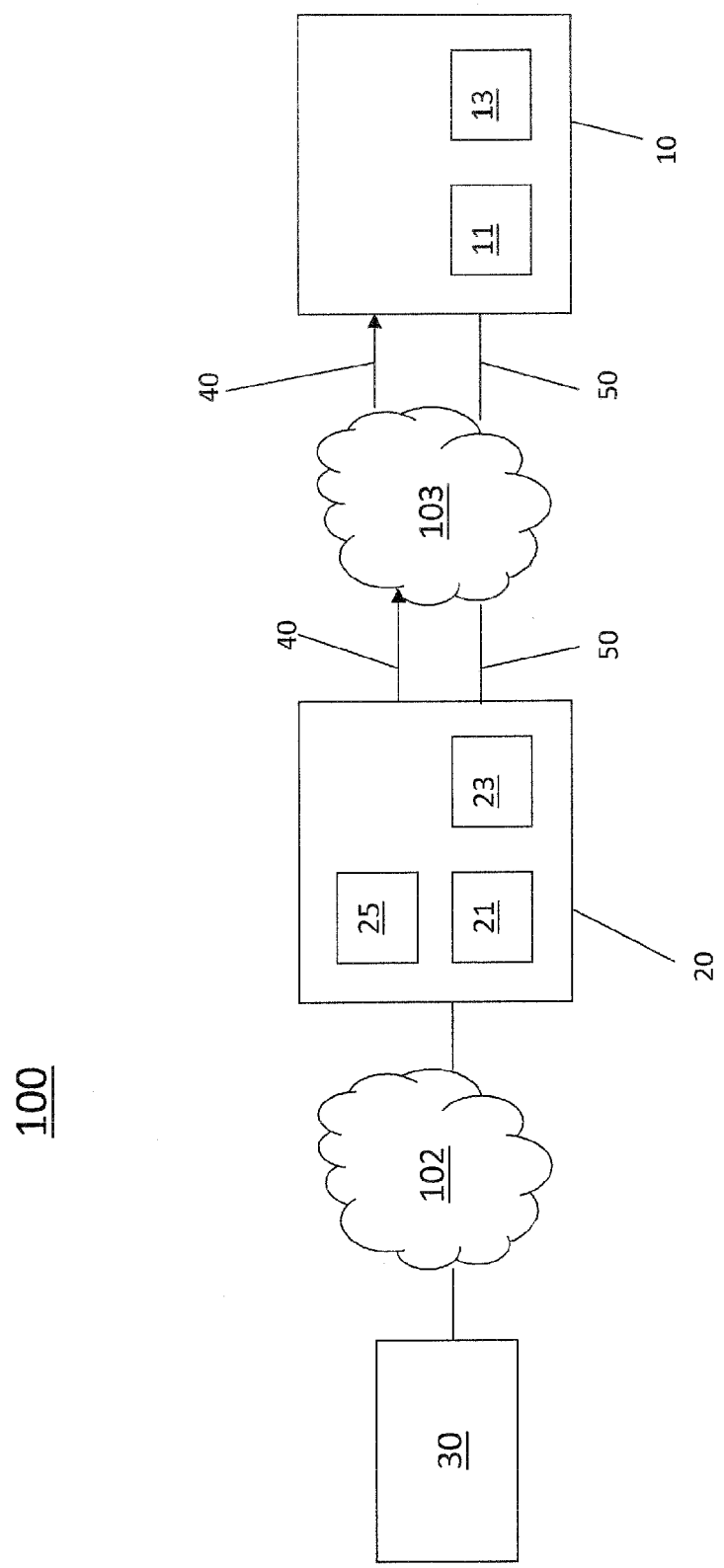
FIG. 1 is a block diagram illustrating a wireless communication system, in accordance with a first exemplary embodiment of the present disclosure.

FIG. 1 is a block diagram illustrating a wireless communication system 100, in accordance with a first exemplary embodiment of the disclosure. The system 100 includes a mobile device 10. The mobile device 10 may be or include any type of processor-based mobile computing device that is capable of wireless communications, including for example, any Internet appliance, hand-held device (including palm-top computers, wearable computers, cellular or mobile phones, multi-processor systems, processor-based or programmable consumer electronics, network computers, minicomputers, tablet computers) and the like. As shown in FIG. 1, the mobile device 10 may be a robot. The mobile device 10 includes a processor 11 and computer-readable medium 13.

A server 20 is provided that includes a connection interface 25, and computer-readable storage media 23. One having ordinary skill in the relevant field will readily understand that the server 20 may be a web server, database server or generally any network host capable of storing data and connected to any type of data network, including the Internet. The server 20 may include a processor 21 and may perform computer-executable programs that may be stored within the server or elsewhere in a computer network. Computer-readable storage media 23 may include any type of computer-readable memory, including hard-disk drives, solid-state drives, magnetic and optically readable computer disks, and the like. The server 20 may further include a user interface, display, input/output devices and any other devices, components and equipment that one having ordinary skill in the relevant art would understand to be commonly associated with such a server. The various functions of the server 20 as described herein—including the storage of data as well as the execution of tasks, processes, algorithms and the like—may be distributed among other devices remote from the server 20 networked and in communication with the server 20.

The system 100 may further include one or more messaging devices 30. Connection interface 25 enables communication between the server 20 and other devices, including mobile device 10 and messaging device 30. The messaging device 30 is a computerized device used by any user of the system 100 to send messages to and/or receive messages from mobile device 10. The messaging device 30 may be any computer, including any personal computer, Internet appliance, hand-held device (including palm-top computers, wearable computers, cellular or mobile phones, multi-processor systems, processor-based or programmable consumer electronics, network computers, minicomputers) and the like.

A messaging device 30 may communicate with the server 30 over at least one network system 102. The network system 102 may include any type of network infrastructure, such as the Internet, or any other wired, wireless and/or partially wired network.

The mobile device 10 may communicate with the server 20 over an at least partially wireless network system 103. The network system 103 may include any type of wireless network infrastructure, including wireless routers, modems and the like.

In the system 100, push technology is used to automatically and quickly maintain or regain connection to a wireless device, such as mobile device 10. Push technology is a communication technology known to those having ordinary skill in the relevant field. Generally speaking, "push technology" refers to a style of Internet-based communication where the request for a given transaction is initiated by the publisher or central server (i.e. a "push communication"). Examples of push technology which may be utilized for push communication with mobile device 10 within system 100 is the "Google Cloud Messaging" (GCM) protocol and Google's previous generation technology known as "Cloud to Device Management" (C2DM)). GCM and C2DM are notification services that allow data to be sent from servers to applications on Android devices (e.g., computerized devices running the Android operating system). Systems utilizing push technology are typically used to send data to devices without the need for the devices to login to a remote server after power up. Rather, the device just needs a local connection that has internet access. However, a drawback of push technology is that it is often slower than some of the other non-push methods of transferring data such as, for example, Extensible Messaging and Presence Protocol (XMPP), which is used for many internet messaging systems such as Jabber.

The system 100 shown in FIG. 1 combines push technology with other non-push methods to produce a fast and reliable wireless connection to the mobile device 10 that is sustained across wireless boundaries and also in environments where the wireless signal is noisy, intermittent, or weak.

A message may be provided to the mobile device 10 by way of a push communication 40 and a non-push communication 50. The push communication 40 may be, for example, any Internet-based communication where the request for a given transaction is initiated by the server 20. That is, the server 20 "pushes" data (e.g., a message) to the mobile device 10 when a message for the device 10 becomes available at the server 20. In contrast, a non-push communication 50 may be, for example, any communication in which the request for the transmission of the message is initiated by the mobile device 10, and may include any communication provided utilizing pull technology. The push communication 40 may include a GCM or C2DM communication, and the non-push communication 50 may include a XMPP communication.

The message provided to the mobile device 10 by push communication 40 is the same message (or a duplicate) as the message that is provided to the mobile device 10 by non-push communication 50.

It is to be noted that, as used herein, "message" refers to the general instruction, command, text, video, images, etc. which is conveyed over a communication. The "message" is not dependent on the actual formatted data which is communicated (which differs depending on communication protocol). Further, a "duplicate message" as used herein refers to a duplicate of the message itself, not an exact duplicate of the coded and/or formatted communication which contains the message. Thus, a specific text message (e.g., "Hello"), robot command message (e.g., "move left") or the like may be communicated over a push communication, while the "duplicate message" may be communicated over a non-push communication (e.g., "Hello" or "move left" or the like), even though the push communication containing the "message" and the non-push communication containing the "message" are not duplicates due to the different communication protocols, formatting of data, and so on. A message may include voice, video, text, robot commands or any other type of message.

The message may contain an identifier which identifies the message, thereby allowing the messages, as provided by push communication 40 and non-push communication 50 to be quickly identified as duplicative of one another. Whichever message (i.e. the message provided by push communication 40 or the duplicate message provided by non-push communication 50) is received by the mobile device 10 first will be utilized by the mobile device 10. How the mobile device 10 utilizes the received message depends on what type of message it is. For example, if the message is a text, video or image based message, the message may be displayed by mobile device 10. The message may be, for example, a text message provided by a cellular device. The mobile device 10 may be a robot and the message may be, for example, an instruction used to direct the robot to perform an action, such as moving in a particular direction.

The message that is first received by the mobile device 10 (i.e. the message provided by push communication 40 or the duplicate message provided by non-push communication 50) is stored for example in a database in computer-readable medium 13. As an alternative to storing the entire contents of the message, the mobile device 10 may store only the identifier which identifies the message in the database in computer-readable medium 13 Furthermore, the time at which the message is received may be associated with the message and stored in computer-readable medium 13.

When the mobile device 10 receives the duplicate message (i.e. the later-received of the message provided by push communication 40 or by non-push communication 50), the message is compared to messages stored, for example, in a database in computer-readable medium 13. As an alternative to comparing the entire contents of the duplicate message with the stored message, the mobile device 10 may compare only the identifier which identifies the duplicate message with the identifier which identifies the message which is stored in the database in computer-readable medium 13. If the duplicate message (i.e. the later received message) matches with a message that is already stored in computer-readable medium 13 of the mobile device 10 (e.g., the first received message provided via either push 40 or non-push communication 50), then the mobile device 10 may determine that the later received message is a duplicate. Furthermore, the time at which the duplicate message is received may be associated with the duplicate message such that the mobile device 10 may determine a difference in time between receiving the two messages (i.e. the message and the duplicate message, as provided by push communication 40 and non-push communication 50).

Additionally or alternatively, the mobile device 10 may begin a timer (e.g., a software or hardware timer within the device 10) when the first message is received. A timeout value, or a certain amount of delay between receiving a message and receiving a duplicate message, may be predetermined and set within the mobile device 10. If the second message (i.e. the duplicate message) never arrives, or if timeout value expires between receiving the first message and the second message, then the mobile device 10 may indicate that a timeout or very long delay has occurred. If, for example, the delay time for the message provided by non-push communication 50 (e.g., XMPP) is very long or times out, then that would suggest that the non-push communication 50 method with the mobile device 10 may have lost its connection and needs to be reset. That can happen, for example, when crossing a wireless boundary. That is, the mobile device 10 may lose its non-push communication 50 connection with the server 20 as it moves outside of the coverage area of one wireless network (e.g. wireless network 103) and into another wireless network coverage area.

Alternatively or additionally, the mobile device 10 may echo the received messages, or may otherwise transmit a communication identifying the receipt by the mobile device 10 of the messages, to the server 20. The server 20 may thus calculate the delay time between receipt of the messages sent via push communication 40 and non-push communication 50 and/or determine whether a timeout has occurred, utilizing the same techniques as disclosed above. For example, the server 20 may store the first message received by the mobile device 10 (which is echoed or otherwise transmitted to the server after receipt of that message by the mobile device 10) in a database accessible to the server 20. Furthermore, the time at which the message was received by the mobile device 10 (alternatively or additionally, the time at which the echoed message was received by the server 20) may be associated with the echoed message and stored in the database accessible to the server 20.

When the server 20 receives the echoed duplicate message (i.e. the later-received, by the mobile device 10, of the message provided by push communication 40 or by non-push communication 50), the message is compared to the stored messages. If the duplicate message matches with a message that is already stored in the database accessible to the server 20 (e.g., the first received message provided via either push 40 or non-push communication 50), then the server 20 may determine that the later received message is a duplicate. Furthermore, the time at which the duplicate message was received by the mobile device 10 (alternatively or additionally, the time at which the echoed duplicate message was received by the server 20) may be associated with the echoed duplicate message such that the server 20 may determine a difference in time between the receipt of the two messages (e.g., the time of receipt by the mobile device 10 of the message and the duplicate message, or the time of receipt by the server 20 of the echoed message and echoed duplicate message).

As an alternative to comparing the entire contents of the duplicate message with the stored message, the server 20 may compare only the identifier which identifies the duplicate message with the identifier which identifies the message which is stored in the database accessible to the server. Additionally or alternatively, the server 20 may begin a timer (e.g., a software or hardware timer within or otherwise accessible to the server 20) when the first echoed message is received by the server 20 from the mobile device 10. A timeout value, or a certain amount of delay between receiving an echoed message and receiving an echoed duplicate message, may be predetermined and set, for example, within the server 20. If the second message (i.e. the duplicate message) never arrives at the server 20, or if timeout value expires between the server 20 receiving the echoed message and the echoed duplicate message, then the server 20 may indicate that a timeout or very long delay has occurred. If, for example, the delay time for the message provided by non-push communication 50 (e.g., XMPP) is very long or times out, then that would suggest that the non-push communication 50 method with the mobile device 10 may have lost its connection and needs to be reset. As discussed above, that can happen, for example, when crossing a wireless boundary. That is, the mobile device 10 may lose its non-push communication 50 connection with the server 20 as it moves outside of the coverage area of one wireless network (e.g. wireless network 103) and into another wireless network coverage area.

Figure 2:
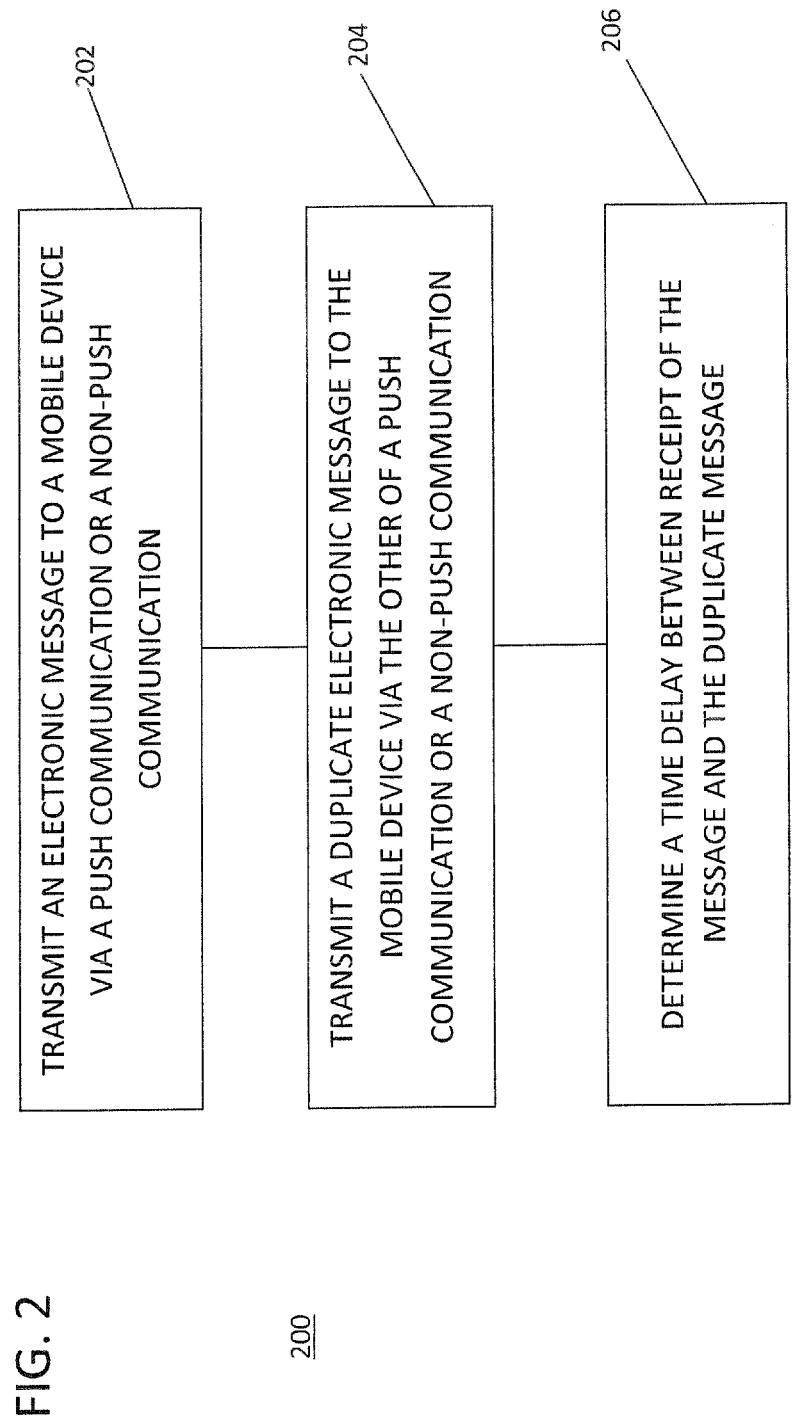
FIG. 2 is a flowchart illustrating a method of wireless communication, in accordance with the first exemplary embodiment of the present disclosure.

FIG. 2 is a flowchart 200 illustrating a method of wireless communication, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently in reverse order, depending on the functionality involved, as would be understood by those reasonably skilled in the art of the present invention.

At block 202, an electronic message is transmitted to a mobile device 10 via one of a push communication 40 and a non-push communication 50. At block 204, a duplicate of the electronic message is transmitted to the mobile device 10 via the other of a push communication 40 and a non-push communication 50. The mobile device 10 may be a it robot. The electronic message and the duplicate message may be transmitted to the mobile device 10 by the server 20. The push communication may comprise a communication using a GCM or C2DM protocol and the non-push communication may comprise a communication using Extensible Messaging and Presence Protocol (XMPP). The message may be any type of message, including for example, a video message, a voice message or a text message.

At block 206, a time delay between receipt by the mobile device 10 of the message and the duplicate message is determined. The time delay may be determined by the mobile device 10 and/or the server 20. The mobile device 10 may be configured to determine that a timeout condition has occurred if the duplicate message has not arrived within a certain amount of time after receipt of the message. The mobile device 10 may be configured to reset a wireless connection upon determination of a timeout condition.

Figure 3:
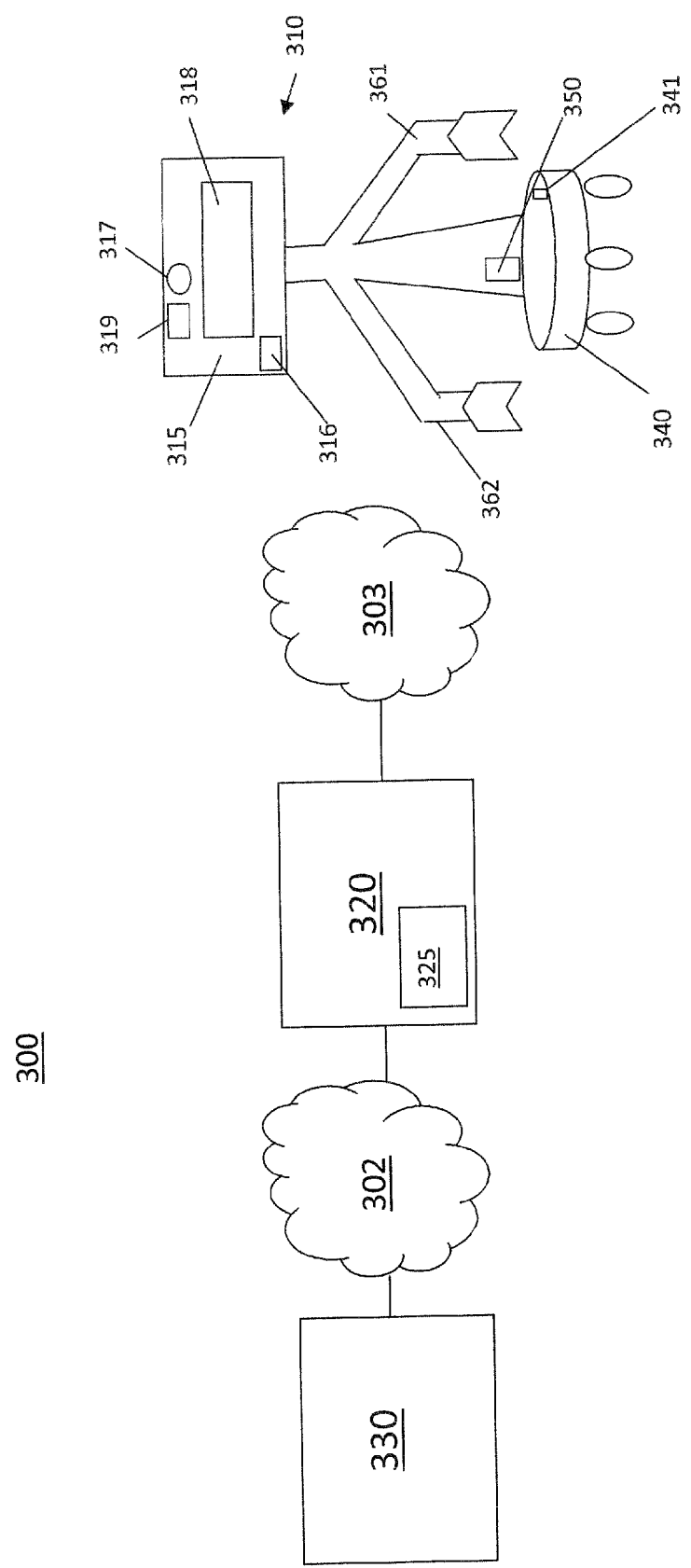
FIG. 3 is block diagram illustrating a system for wireless communication with a robot, in accordance with an exemplary embodiment of the present disclosure.

FIG. 3 is a block diagram illustrating a system 300 for wireless communication with a robot, in accordance with a second exemplary embodiment of the disclosure. The system 300 is similar in certain respects to the system 100 shown in FIG. 1, and may include any of the features and functionality of system 100 as described above.

The robot 310 may be a telepresence robot, and may include a locomotion platform 340, which may be or include any known technology for facilitating movement by a robot. The locomotion platform 340 may be, for example, a commercially-available platform such as the iRobot Create. The robot 310 further includes various control and sensing elements 350. The control and sensing elements 350 may include, for example, servos, actuators and motors for controlling movement of the robot 310. The control and sensing elements 350 may further include any type of sensors, including sensors for sensing the robot's 310 environment, such as: cameras, infrared cameras (e.g., for sensing environmental heat sources as well as personal blood flow distribution); radar sensor or Doppler radar sensor (for movement detection and detection of personal respiration and heart rates); tactile sensors which may be piezoresistive, piezoelectric, capacitive and/or electroresistive sensors which may be sensitive to touch, force and/or pressure; cliff sensors for sensing the presence of a "cliff" or other terrain features; bump sensors, which may be a force sensor for sensing when the robot 310 has bumped into an object; humidity sensors, which may be a hygrometer for sensing the humidity in the environmental air; chemical sensors, which may be a potentiometric sensor for sensing chemical components of an environment; vibration sensors, which may be a piezoelectric sensor or accelerometer for sensing vibrations; ultraviolet sensor, for sensing ultraviolet radiation; ultrasonic sensor, which may be used for detecting people, for detecting the fullness of liquid in a tank (e.g., a fuel tank, etc.), for measuring wind speed and direction, or for any other known uses; temperature sensors for sensing an environmental temperature and/or for sensing the temperature of the robot 310 or any other heat emitting or sensitive component, and the like. The control and sensing elements 350 communicate with the robot microcontroller 341.

The robot 310 may further include a display 318, camera 317 and speaker 319, all of which may be incorporated in a mobile computing device 315 such as an Android-based tablet computer having a processor 316.

The system 300 may further include a server 320, which may be a web server, database server or generally any network host capable of storing data and connected to any type of data network, including the Internet. Further, the server 320 may include or be a part of a distributed network or cloud computing environment. Any type of electronic and/or computerized device that is capable of storing information may be included as the server 320, and is considered within the scope of this disclosure. The server 320 may include computer-readable storage media, and a processor for processing data and executing algorithms, including any of the processes and algorithms set forth in this disclosure. A robot interface application 325 is at least partially hosted on the server 320, and is electronically accessible over at least one network system 302.

The server 320, application 325 and network system 302 may include a variety of hardware and software components to provide successful functioning of the server 320 and the application 325, as is well-known within the art. Further, any features, characteristics, designs and/or functions that are known within the art may be included with the system 300 to further enhance its efficiency.

The application 325 may include or provide access to a web or network-based software platform, including a graphical user interface or webpage which provides interactive access to the robot 310 to a user of a user device 330. The user device 330 is a computerized device used by any user of the system 300 to interface with or control the robot 310. The user device 330 may be any computer, including any personal computer, Internet appliance, hand-held device (including palm-top computers, wearable computers, cellular or mobile phones, multi-processor systems, processor-based or programmable consumer electronics, network computers, minicomputers) and the like.

The control and sensing elements 350 (including, for example, robot motors, sensors, and actuators) are configured to communicate with the microcontroller 341. The microcontroller 341 receives inputs and sends outputs in several ways, any one of which or combination serves to command the robot 310 and to receive information from the robot 310, including: Direct wifi connection; Wifi connected via 4G or other wireless protocol modem; Direct 4G or other wireless protocol connection; Bluetooth or other local wireless connection; Serial, USB, or other local wired connection.

The robot 310 (which may be, for example, a telepresence robot) may be driven by a remote user in the following manner:

The user uses the user device 330 to connect to a website, which may be provided by the robot interface application 325. The user device 330 connects to the application 325 over a network system 302, which may include any type of network infrastructure, such as the Internet, or any other wired, wireless and/or partially wired network. The application 325 may communicate with the robot 310 over an at least partially wireless network system 303, which may include any type of wireless network infrastructure, including wireless routers, modems and the like.

The user device 330 may be utilized by a user to make inputs (e.g., video inputs, voice inputs, robot commands, etc.) to the application 325 and/or website, and to receive and display information from the robot 310 at the application 325 and/or website. User inputs may be transmitted to the robot using a push technology, such as "Google Cloud Messaging" (GCM) or Google's previous generation technology "Cloud to Device Management" (C2DM), which facilitates push communications to the robot. The advantage of push communications over non-push techniques is that the robot 310 does not have to continuously poll the application 325 and/or website to know when a user sends commands. Instead, utilizing push technology, the commands are pushed to the robot 310 as they are entered.

The user inputs are received by the mobile computing device 315 of the robot 310 over the at least partially wireless network system 303. The mobile computing device 315 may be an Android-based device, connected through a WiFi or a cellular connection (e.g., 4G). The mobile computing device 315 then sends the received input (e.g. the robot commands) to the microcontroller 341 using, for example, a Bluetooth connection, an "Android accessory" device, or a standard serial protocol. The microcontroller 341 receives the commands and runs the robot 341 accordingly. The microcontroller 341 also sends information (for example, information received or determined from the control and sensing elements 350) to the Android-based mobile computing device 315, which acts on it and/or sends the information to the application 325 and/or website for display to the user of the user device 330. The mobile computing device 315 may also send and receive audio and video, establishing a two-way video chat with the user.

Alternatively or additionally, the mobile computing device 315 and/or microcontroller 341 may transmit and receive messages using analog communications such as radio (e.g., 72 mhz radio). For example, the robot 310 may be located in an environment remotely located from the user device 330. A radio transmitter/receiver may be located in the remote environment, connected to the network system 303. Another radio transmitter/receiver may be located on the robot 310 such that commands from the user device 330 may be transmitted through the network system 303 (which may be, for example, a wired Internet connection) and converted to radio for transmissions to and from the robot 310 in the remote environment. Thus, within the remote environment, messages and/or commands may be sent and received with essentially no latency and with no conflicts with local Wi-Fi users. Further, the radio transmitter/receiver in the remote environment may be connected to a computer, thus allowing the robot 310 to be locally (i.e. within the remote environment) controlled by a user of the computer through radio communications. Such control is completely independent of both the Internet and the local network (i.e., a local Wi-Fi or other network) and has essentially no lag.

Furthermore, the system 300 may be capable of connecting many users to the robot 310 simultaneously. For example, multiple users may connect to the application 325 (which may be or include a website) using user devices 330. The application 325 may require authorization input (such as a username and password, or the like) in order to remotely access the robot 310. One user may be designated as the "pilot" and may have operational control over the robot 310. The "pilot" designation may automatically be applied to the first user to access the robot 310 using application 325. Alternatively, the "pilot" status may be associated with particular authorization input (e.g., a particular username and password). Once a "pilot" has controlling access to the robot 310, other users may access the robot 310 as "passengers." That is, the passengers may receive and/or input certain information to the robot 310 (such as video, audio and/or textual information), but the passengers do not have control over the robot's 310 movements. At the pilot's discretion, the pilot role can be distributed to some passengers, for example, to allow one passenger to drive the left robot arm 361, another to control the right robot arm 362, while the pilot controls the overall movement and positioning of the robot 310.

Figure 4:
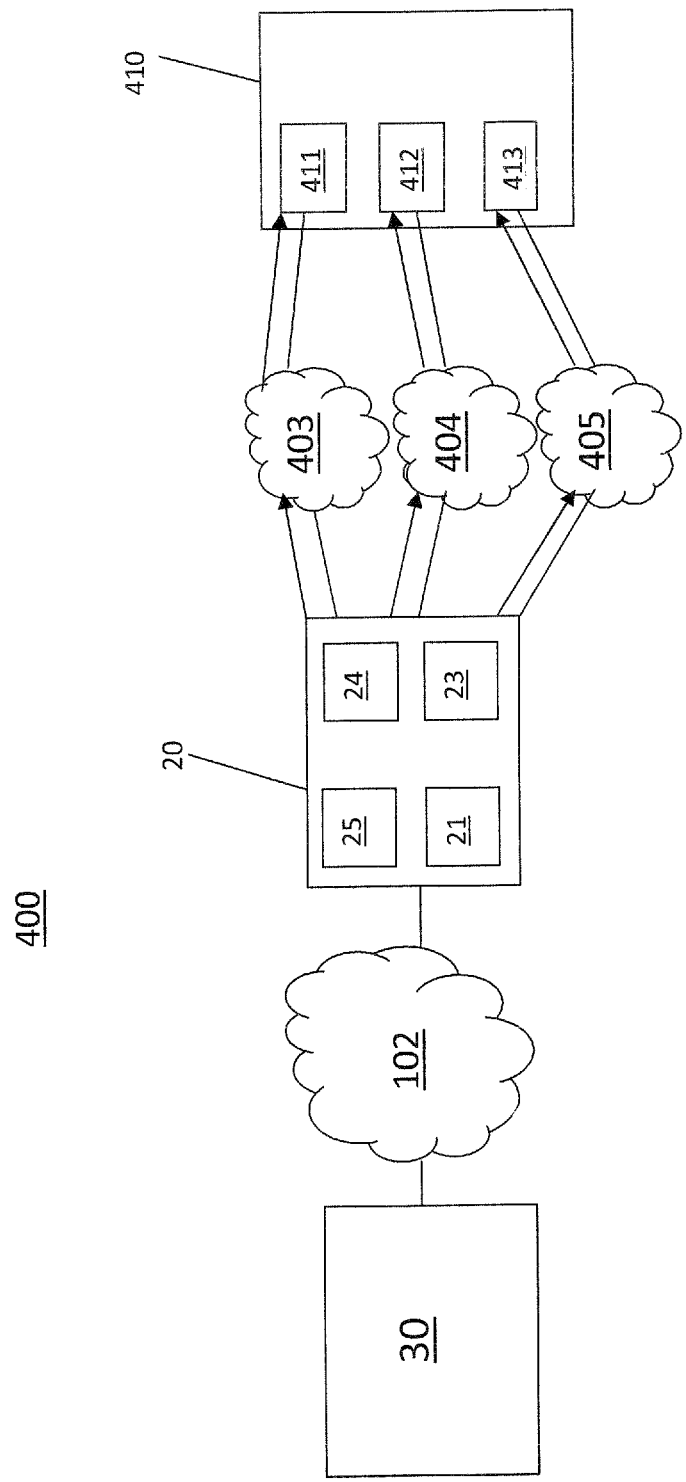
FIG. 4 is a block diagram illustrating a system for wireless communication, in accordance with an exemplary embodiment of the present disclosure.

FIG. 4 is a block diagram illustrating a wireless communication system 400, which includes many of the features of the system shown in FIG. 1. As shown in FIG. 4, a single mobile device 410 may include multiple wireless communication modules 411, 412, 413. A user, e.g. a user of device 30, may communicate with the mobile device 410 simultaneously over each of the wireless communication modules 411, 412, 413. That is, any command or other message may be transmitted to, or received from, the mobile device 410 over three separate communication links. The wireless communication modules 411, 412, 413 may be any modules, including hardware and/or software as known to one having ordinary skill in the relevant art, for wireless communication over any wireless network or protocol, including WiFi, 3G, 4G, Bluetooth, radio and so on.

As an example, a device 30 may be connected to the mobile device 410 with two WiFi communication modules 411, 412, as well as a cellular (3G/4G) module 413. Communication with wireless communication modules 411, 412, 413 may be enabled over network systems 403, 404, 405, which may be separate network systems, or may be part of the same network system. In operation, the mobile device 410 may be broadcasting and receiving messages over all three communication links. The messages may be communicated using the methods described herein, for example with respect to FIG. 1. For example, a message may be transmitted over each of the three separate communication links using a push communication (e.g., GCM or C2DM) 441, 442, 443 and a non-push communication (e.g., XMPP) 451, 452, 453. Thus, the latencies of communications with the mobile device 410 may be continually updated from two different wireless access points (which may in turn be connected through two completely different systems, with different IP addresses, etc) as well as over cellular (3G/4G). That is, the latency times may be monitored on each of the communication paths, with the mobile device 410 using the fastest ones (e.g., shortest latency communication) at any one time. Then when a communication link goes down, communication with the mobile device 410 may be maintained via the other communication links while the communication link that is down may be re-established or replaced with a new access point.

Alternatively, a message may be transmitted over two or more communication links using only push, or only non-push, communications. For example, the device 30 may be connected to the mobile device 410 with two WiFi connections (each on different channels) at once. A message may be transmitted over the separate channels as a push communication, or as a non-push communication.

Communication over multiple communication links provides significant improvement of the smoothness of transitions (e.g., as the mobile device 410 moves between wireless boundaries) and also allows the system 400 to anticipate when and whether to change over from one wireless communication link to another. The combination of using XMPP and GCM or C2DM through multiple access routes or communication links provides a very stable and smooth connection to and from the server 20 and the device 410 (which may be any mobile device, including a robot) as it moves around and/or as the signal qualities degrade and/or improve with time and/or location.

In the systems and methods provided by the present disclosure, latency is primarily used to determine the quality of a wireless connection. Signal strength and bandwidth may be only secondary considerations. This is because short messages may be of primary concern (e.g., robot commands), which need to arrive to a mobile device quickly in order to be useful. However, other types of messages may be communicated using the concepts provided by this disclosure, including two-way video chat, which does consume considerable bandwidth. However, it may be more desirable to deal with degraded video (e.g., due to decreased bandwidth) than it would be to accept long latency times for commanding a robot. Moreover, it is possible to send and receive video chat over a different connection (perhaps one with higher bandwidth but longer latency) than the connection utilizing the concepts provided herein (e.g., duplicate push and non-push communications; using the shortest latency communication) for commanding a robot.

Since each command or message goes out from the server 20 over all the different paths (e.g., to wireless modules 411, 412, 413), the mobile device 410 may use the command or message from the path that arrives first, and may further note or record the arrival times from the subsequent paths. The received communications may be echoed so that the server 20 and the mobile device 410 both may determine and know the one-way and round-trip latencies of all the paths. If, for some reason, the best path from server 20 to mobile device 410 is different than from mobile device 410 to server 20, the fastest communication path in each direction may be utilized, since communications may be transmitted on all the paths, whether originating from the mobile device 410 or from the server 20.

Figure 5:
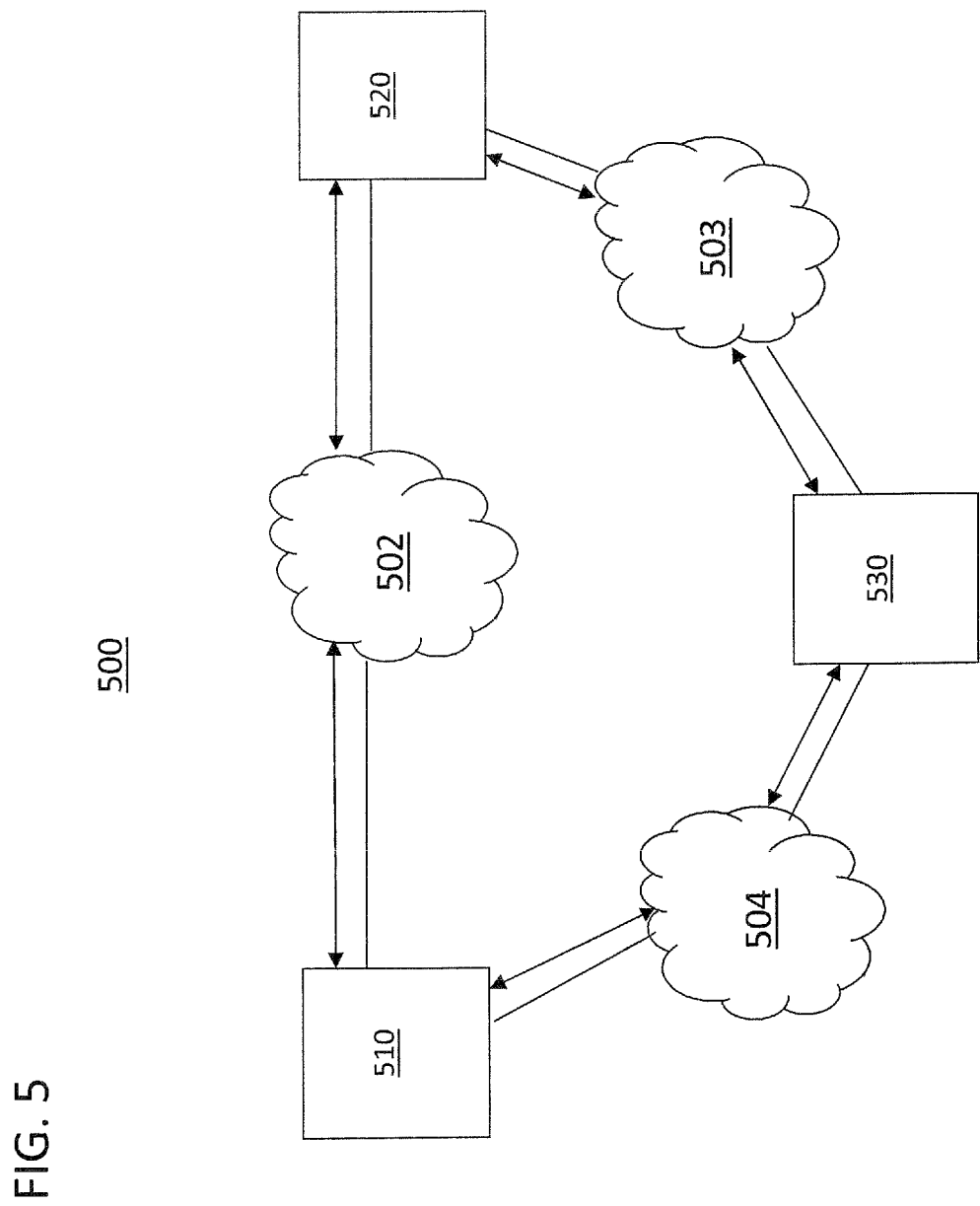
FIG. 5 is a block diagram illustrating a system for wireless communication, in accordance with an exemplary embodiment of the present disclosure.

Communications utilizing the concepts provided by this disclosure are not limited to communications between a server and a mobile device. FIG. 5 is a block diagram illustrating a wireless communication system 500 between mobile devices 510, 520, 530, which includes many of the features of the system shown in FIG. 1. Rather than communicating directly with a server, as described with respect to FIG. 1, the same concepts may be utilized in communications between mobile devices 510, 520, 530. That is, the mobile devices 510, 520, 530 may transmit and receive messages between one another utilizing both a push communication and a non-push communication, as described herein. The mobile devices 510, 520, 530 may be robots and may communicate over network systems 502, 503, 504, which may be separate network systems or may be part of the same network system.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for wireless communication with a mobile device, comprising:
a server configured to transmit an electronic message to a mobile device via one of a push communication and a non-push communication, said server further configured to transmit a duplicate of said electronic message to the mobile device via an other of a push communication and a non-push communication, and wherein the mobile device is configured to determine a time delay between receipts of the message and the duplicate message.

2. The system of claim 1, wherein the mobile device comprises a robot.

3. The system of claim 1, wherein the push communication comprises a communication using Cloud to Device Management (C2DM) or Google Cloud Messaging (GCM) protocol.

4. The system of claim 3, wherein the non-push communication comprises a communication using Extensible Messaging and Presence Protocol (XMPP).

5. The system of claim 1, wherein the message comprises at least one of a video message, a voice message and a text message.

6. The system of claim 2, wherein the message comprises a message for controlling the robot.

7. The system of claim 1, wherein the mobile device is configured to determine that a timeout condition has occurred if the duplicate message has not arrived within a certain amount of time after receipt of the message.

8. The system of claim 7, wherein the mobile device is configured to reset a wireless connection upon determination of a timeout condition.

9. The system of claim 1, wherein the mobile device is configured to echo the message and the duplicate message to the server.

10. A mobile computer device comprising:
a processor configured to receive an electronic message transmitted via push communication and to receive a duplicate of the electronic message via non-push communication; and a timer in communication with the processor, wherein the timer is configured to determine a time difference between the time of receipt of the message via push communication and the time of receipt of the duplicate message via non-push communication.

11. The mobile computer device of claim 10, wherein the mobile device comprises a robot.

12. The mobile computer device of claim 10, wherein the push communication comprises a communication using Cloud to Device Management (C2DM) or Google Cloud Messaging (GCM) protocol.

13. The mobile computer device of claim 12, wherein the non-push communication comprises a communication using Extensible Messaging and Presence Protocol (XMPP).

14. The mobile computer device of claim 10, wherein the message comprises at least one of a video message, a voice message and a text message.

15. The mobile computer device of claim 11, wherein the message comprises a message for controlling the robot.

16. The mobile computer device of claim 10, wherein the mobile device is configured to determine that a timeout condition has occurred if the duplicate message has not arrived within a certain amount of time after receipt of the message.

17. The mobile computer device of claim 16, wherein the mobile device is configured to reset a wireless connection upon determination of a timeout condition.

18. The mobile computer device of claim 10, wherein the mobile device is configured to echo the message and the duplicate message to the server.

19. A method of wireless communication, comprising:
transmitting an electronic message to a mobile device via one of a push communication and a non-push communication;
transmitting a duplicate of the electronic message to the mobile device via an other of a push communication and a non-push communication; and
determining a time delay between receipts of the message and the duplicate message.

20. The method of claim 19, wherein the electronic mobile device comprises a robot.

21. The method of claim 19, wherein the push communication comprises a communication using Cloud to Device Management (C2DM) or Google Cloud Messaging (GCM) protocol and the non-push communication comprises a communication using Extensible Messaging and Presence Protocol (XMPP).

22. The method of claim 19, wherein the message comprises at least one of a video message, a voice message and a text message.

23. The method of claim 19, wherein the mobile device is configured to determine that a timeout condition has occurred if the duplicate message has not arrived within a certain amount of time after receipt of the message.

24. The method of claim 23, wherein the mobile device is configured to reset a wireless connection upon determination of a timeout condition.

25. The method of claim 19, wherein the mobile device is configured to echo the message and the duplicate message to a server from which the message and duplicate message were received.

26. A system for wireless communication with a robot, comprising:
a user device;
a robot interface application, hosted at least partially on a server; and
a robot,
wherein the robot interface application is configured to receive an electronic message from the user device, and to transmit said electronic message to the robot via one of a push communication and a non-push communication, said robot interface application further configured to transmit a duplicate of said electronic message to the robot via an other of a push communication and a non-push communication.

27. The system of claim 26, wherein the robot interface application comprises a website.

28. A robot control system, comprising:
a robot interface application for facilitating communication between a plurality of user devices and a robot, comprising two or more wireless communication modules
wherein the robot interface application is configured to whereby to receive an electronic message from the user device, and to transmit said electronic message to each of said two or more wireless communication modules of the robot via one of a push communication and a non-push communication, to provide one of said plurality of user devices with operational control over the robot, and to simultaneously provide the others of said plurality of user devices limited access to the robot, wherein said robot interface application is further configured to transmit a duplicate of said electronic message to each of said two or more wireless communication modules of the robot via an other of a push communication and a non-push communication.

29. The system of claim 28, wherein the robot interface application is further configured to allow the user device having operational control over the robot to distribute operational control of the robot among other users of the system.

30. A system for wireless communication with a robot, comprising:
a user device;
a robot interface application, hosted at least partially on a server; and
a robot comprising two or more wireless communication modules,
wherein the robot interface application is configured to receive an electronic message from the user device, and to transmit said electronic message to each of said two or more wireless communication modules of the robot via one of a push communication and a non-push communication, and wherein said robot interface application is further configured to transmit a duplicate of said electronic message to each of said two or more wireless communication modules of the robot via an other of a push communication and a non-push communication.

31. A system for wireless communication between mobile devices, comprising:
a plurality of mobile devices, each of said mobile devices being configured to transmit an electronic message to another of said mobile devices via one of a push communication and a non-push communication, and further configured to transmit a duplicate of said electronic message to said another mobile device via an other of a push communication and a non-push communication.

* * * * *